US008239918B1

(12) United States Patent
Cohen (10) Patent No.: US 8,239,918 B1
(45) Date of Patent: Aug. 7, 2012

(54) APPLICATION MARKETPLACE ADMINISTRATIVE CONTROLS

(75) Inventor: Gabriel A. Cohen, Alameda, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/270,457

(22) Filed: Oct. 11, 2011

(51) Int. Cl.
*G06F 21/00* (2006.01)

(52) U.S. Cl. .............................................. 726/1; 726/27

(58) Field of Classification Search .............. 726/1, 4–5, 726/26–29; 707/694
See application file for complete search history.

(56) References Cited

U.S. PATENT DOCUMENTS

| | | | |
|---|---|---|---|
| 6,917,923 | B1 | 7/2005 | Dimenstein |
| 7,802,294 | B2 * | 9/2010 | Perlin et al. ........................ 726/9 |
| 7,908,642 | B2 * | 3/2011 | Rubio et al. ....................... 726/2 |
| 2005/0086391 | A1 | 4/2005 | Chu et al. |
| 2006/0090192 | A1 | 4/2006 | Corby et al. |
| 2006/0130054 | A1 | 6/2006 | Bocking et al. |
| 2007/0180490 | A1 | 8/2007 | Renzi et al. |
| 2008/0052383 | A1 | 2/2008 | O Shaughnessy et al. |
| 2008/0148298 | A1 | 6/2008 | Chatterjee et al. |
| 2008/0155647 | A1 * | 6/2008 | Miyawaki et al. ................. 726/1 |
| 2008/0274765 | A1 | 11/2008 | Lopez et al. |
| 2009/0037492 | A1 * | 2/2009 | Baitalmal et al. ............. 707/201 |
| 2009/0132718 | A1 | 5/2009 | Groll et al. |
| 2009/0157452 | A1 * | 6/2009 | Arora et al. ........................ 705/7 |
| 2010/0017857 | A1 * | 1/2010 | Kramer .............................. 726/4 |
| 2010/0131386 | A1 | 5/2010 | Shiely et al. |
| 2010/0287598 | A1 | 11/2010 | Korkishko et al. |
| 2011/0047597 | A1 | 2/2011 | Mahaffey et al. |
| 2011/0145920 | A1 * | 6/2011 | Mahaffey et al. ............... 726/22 |
| 2011/0230211 | A1 * | 9/2011 | Kim et al. .................. 455/456.4 |

OTHER PUBLICATIONS

M. Ongtang, K. Butler, and P. McDaniel. Porscha: Policy oriented secure content handling in android. pp. 221-230, 2010.
J. O'Connor. Attack surface analysis of Blackberry devices. White Paper: Symantec security response, 2007.
M. Ongtang, S. McLaughlin, W. Enck, and P. McDaniel. Semantically rich application-centric security in android. pp. 340-349. IEEE, 2009.
Shin, W.; Kiyomoto, S.; Fukushima, K.; Tanaka, T.; , "Towards Formal Analysis of the Permission-Based Security Model for X Android," Wireless and Mobile Communications, 2009. ICWMC '09. Fifth International Conference on, vol., no., pp. 87-92, Aug. 23-29, 2009.
Shabtai, A.; Fledel, Y.; Kanonov, U.; Elovici, Y.; Dolev, S.; Glezer, C.;, "Google Android: A Comprehensive Security Assessment," Security & Privacy, IEEE, vol. 8, No. 2, pp. 35-44, Mar.-Apr. 2010.
A. Shabtai, Y. Fledel, U. Kanonov, Y. Elovici, S. Dolev, "Google Android: A State-of-the-Art Review of Security Mechanisms," CoRR abs/0912.51 01 , 2009.
3LM Three Laws of Mobility: Product Benefits,' Product brochure, reprinted from http://www.3lm.com/product.html on May 19, 2011, 2 pages.
Office Action for U.S. Appl. No. 13/250,631 dated Dec. 30, 2011, 58 pages.

* cited by examiner

*Primary Examiner* — Hadi Armouche (74) *Attorney, Agent, or Firm* — Fish & Richardson P.C.

(57) ABSTRACT

A computer-implemented method includes receiving, by one or more servers associated with an application marketplace, a policy that includes data that identifies one or more users, and a restricted permission. A request is received, by the servers associated with the application marketplace, to access one or more applications that are distributed through the application marketplace, wherein the request includes data that identifies a particular one of the users. One or more of the applications that are associated with the restricted permission are identified by the servers associated with the application marketplace, and access by the particular user to the applications that are associated with the restricted permission is restricted by the servers associated with the application marketplace.

30 Claims, 8 Drawing Sheets

APPLICATION MARKETPLACE ADMINISTRATIVE CONTROLS

TECHNICAL FIELD

The present disclosure relates generally to the management of access to information technology assets.

BACKGROUND

Among their many responsibilities, IT administrators have the task of managing and securing access to an organization's information. To fulfill this obligation, IT administrators manage accounts and passwords for their users, and manage their users' ability to access the organization's various IT systems and data repositories.

One source of risk to the security of IT assets arises when an employee uses personal hardware or software to access the organization's hardware or software systems. An example class of such hardware is smartphones. Specifically, and rather than carry a personal phone to perform personal functions and a corporate phone to perform corporate functions and access corporate data, some users use their personally-owned smartphones as "dual use" personal/business phones, that serve both personal and work needs.

To reduce the risk of exposure to malicious hardware and software, or exposure of their data through malicious exploitation of otherwise benign hardware and software, companies may allow their employees to access corporate data with their smartphones or other personally owned computing devices under predetermined conditions. For example, companies may make sure that their employee's devices have secure access codes, encrypted file systems, and trusted application sandboxes in place before access to the organization's data is granted. Alternatively, IT administrators may prescribe approved configurations of hardware and software that have been tested for use in accessing the organization's data.

As employee-owned, dual-use devices become more common, the restrictions placed on these devices by traditional blacklists and whitelists may become too coarse. For example, in cases in which an IT department uses an application "blocked" list to define applications that are restricted from being installed on a device, the end user may consume time and data bandwidth to download an application only to discover that the application has been blocked from being installed on the device. Employees may find that such a framework may hamstring the usefulness of an application marketplace, particularly when the employee is not directly aware of what applications have or have not been approved for installation on a device that has access to an organization's IT resources. Furthermore, employees may spend money to license applications only to later discover that the applications have been blocked and therefore have little or no value to them.

SUMMARY

In general, this document describes systems and methods for managing applications that may be purchased or otherwise distributed through an application marketplace, portal or store, and installed on user devices. Specifically, an IT administrator may publish a policy to an application marketplace to identify permissions that may be accessed or restricted from access by the application distributed through the application marketplace. The policy may further specify which applications may access, or may not access, data, functions or operations that are associated with user device permissions, such as a permission to access calendar data or contact data. When a user seeks to install an application that seeks to access a function associated with a particular permission, a security application or module associated with the application marketplace determines whether the policy allows or disallows such access before allowing the application to be downloaded or installed. In the situation where a user device is associated with multiple user accounts, the policy (or particular restrictions defined by the policy) may be configured to apply to all user accounts associated with the user device, or to a particular subset of the user accounts.

As used by this disclosure, a "permission" refers to a restriction that limits or otherwise governs access to a part of the code, to data, or to functionality on a device. Permissions, which may be defined by an operating system of the device, may restrict read or write access to particular data, such as a contact database or an email database or, for example, may limit access to device hardware resources or communication resources. A permission may, for example, govern an ability of a user device to access data generated by a particular hardware module, to operate in a "roaming" mode, or to access a 4G network.

Permissions are imposed to protect critical data and code that could be misused to distort or damage the user experience. Permissions are identified by a unique name or label, which often suggests the function that is restricted by the permission, and specify or define an association with the restricted code, data, or function.

According to one general implementation described by this specification, a method includes receiving, by one or more servers associated with an application marketplace, a policy that includes data that identifies one or more users, and a restricted permission. A request is received, by the servers associated with the application marketplace, to access one or more applications that are distributed through the application marketplace, wherein the request includes data that identifies a particular one of the users. One or more of the applications that are associated with the restricted permission are identified by the servers associated with the application marketplace, and access by the particular user to the applications that are associated with the restricted permission is restricted by the servers associated with the application marketplace. Other embodiments of this aspect include corresponding systems and computer program products.

Various implementations of the preceding implementations may include some, all, or none of the following features. The policy can be received from a server associated with an information technology administrator. The policy can be received from a mobile device that is associated with the particular user. The policy can be stored in a collection of policies; and in response to receiving the request, the policy can be selected from among the policies stored in the collection, using the data in the request that identifies the particular user.

In additional examples, restricting access to the applications that are associated with the restricted permission can include providing a user interface that identifies the applications that are associated with the restricted permission, and that includes, for each of the identified applications, an indicator that indicates that access to each of the applications that are associated with the restricted permission is restricted. The indicator can further indicate that each of the applications are distributable through the application marketplace regardless of the restricted permission, and the user interface comprises a user-selectable control for requesting distribution of one or more of the applications regardless of the restricted permission. The indicator that indicates that access to each of the applications is restricted can be provided in a portion of the user interface that would otherwise be used to provide a user-selectable control for requesting distribution of one or more of the applications.

In additional examples, the indicator that indicates that access to each of the applications is restricted can include a disabled control for requesting distribution of the applications. The user interface can comprise a user-selectable control for requesting moderation of the restricted permission. Restricting access to the applications that are associated with the restricted permission can include providing a user interface that identifies one or more applications that are not associated with the restricted permission, and that does not identify the applications that are associated with the restricted permission. Restricting access to the applications that are associated with the restricted permission can include providing a user interface that identifies the applications that are associated with the restricted permission, as restricted applications.

In other examples, providing the user interface that identifies the applications that are associated with the restricted permission can include greying out information that identifies the applications on the user interface. Identifying one or more of the applications that are associated with the restricted permission can include identifying one or more of the applications that perform one or more operations associated with the restricted permission. Identifying one or more of the applications that are associated with the restricted permission can include identifying one or more of the applications that declare use of the restricted permission. Restricting access to the applications that are associated with the restricted permission can include providing, by the servers associated with the application marketplace, indicia descriptive of each of the applications that are not associated with the restricted permission, and omitting indicia descriptive of each of the applications that are associated with the restricted permission.

The systems and techniques described here may provide one or more of the following advantages. For instance, a system can restrict access to corporate data on a permission-by-permission basis, an application-by-application basis, and optionally an account-by-account basis, without overly restricting the user device's access to the rich marketplace of applications that are available for installation and use.

The details of one or more implementations are set forth in the accompanying drawings and the description below. Other features and advantages will be apparent from the description and drawings, and from the claims.

DESCRIPTION OF DRAWINGS

In the drawings, like reference numbers refer to similar elements throughout.

DETAILED DESCRIPTION

Figure 1:
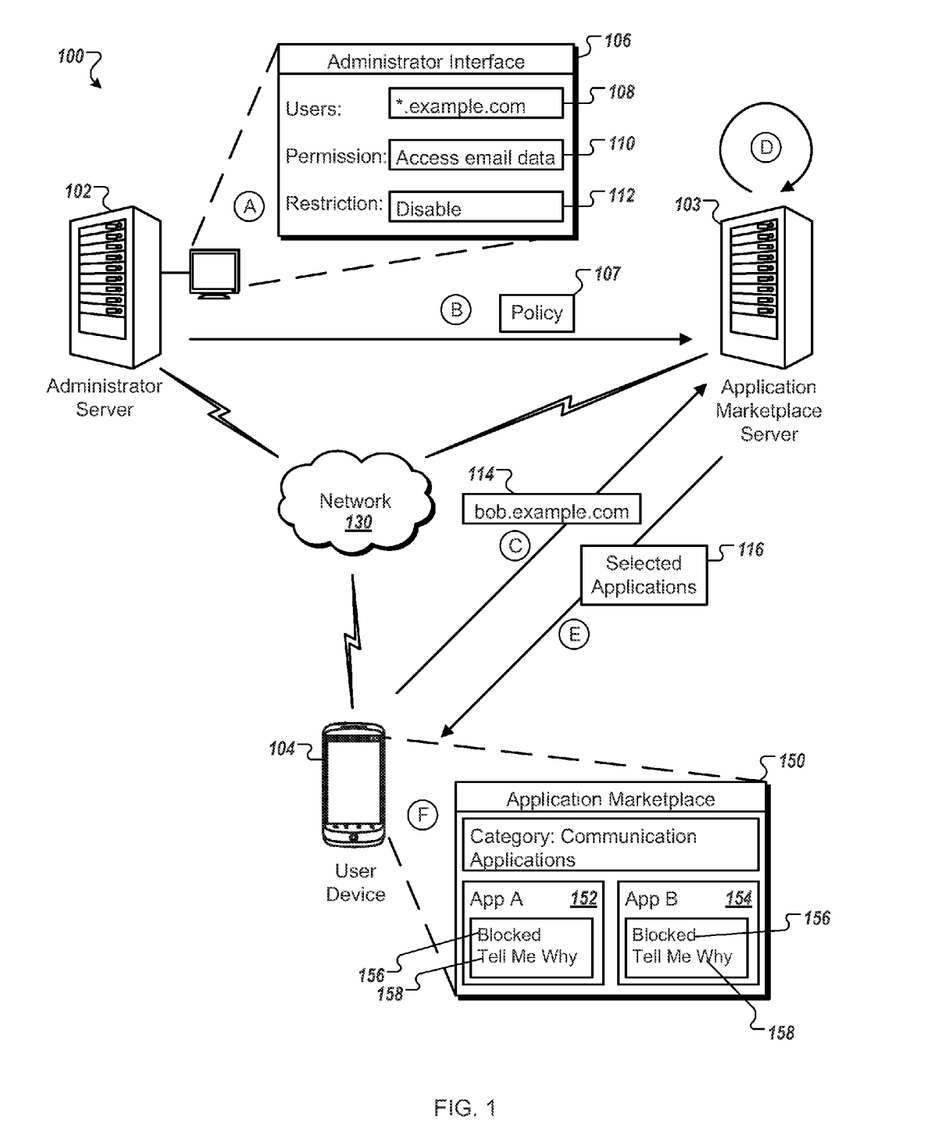
FIG. 1 is a schematic diagram that shows an example system that implements permission-based administrative controls.

FIG. 1 is a schematic diagram that shows an example system that implements permission-based administrative controls. The system 100 includes an administrator server 102, an application marketplace server 103, and a user device 104 that are connected by a network 130

The administrator server 102 is a computer device that provides an administrator interface 106 for use by an employee that manages IT resources on behalf of an organization, e.g., an IT administrator. The network 130 includes a wired or wireless private network, e.g., a corporate local area network or intranet, a public network, e.g., the Internet, a cellular data network, or any other appropriate type of computer network.

The user device 104 is a computing device that is used by the same or a different employee of the organization, and can be a smartphone, a traditional cellular telephone, a personal computer, a tablet computer, an e-book reader, a music player, or any other appropriate type of computing device. The user device 104 may be a dual use device, used by an owner of the device to serve both business and personal needs.

In general, the administrator interface 106 allows the IT administrator to configure settings that define a policy 107, which can at least partly determine the applications that the user device 104 is permitted to install. The IT administrator can use the administrator interface 106 to create the policy 107 that groups user domains, permissions, and applications, and/or that specifies a particular restriction for grouped permissions and applications. The policy 107 may restrict access to corporate data on a domain-by-domain, a permission-by-permission, and/or an application-by-application basis, without overly restricting the user device's access to the rich marketplace of applications that are available for installation and use.

In one example, the policy 107 may specify a grouping such as {contacts permission=all applications} to allow all applications on the user device 104 to access functionality associated with a "contacts" permission; may specify a grouping such as {email permission=application ABC} to only allow an application identified by the identifier "ABC" to access functionality associated with an "email" permission; or may specify a grouping such as {camera permission=no application} to prevent all applications from accessing functionality associated with a "camera" permission. Such a framework allows applications that may require access to restricted permissions to be installed, but only allows such applications to access functionality associated with permissions with which they are paired, or with unrestricted permissions, e.g., to access non-corporate account data.

When applied to the application marketplace server 103, the policy 107 may specify a grouping to selectively allow, prevent, or alter the behavior or appearance of applications that are made available through the application marketplace 150 to selected users or groups of users. In the illustrated example, the administrator interface 106 shows that an administrator is creating the policy 107 that specifies a grouping such as {for all users within the "example.com" domain, "email data access" has been "disabled"} to cause applications that access email data as part of their functionality to be managed differently than unrestricted applications. For example, the application marketplace server 103 may prevent such restricted applications from being presented in the application marketplace 150. As such, the user of the user device 104 may be spared the effort of downloading applications that may have been restricted from being used on the user device 104. Several techniques for handling the presentation of restricted applications in application marketplaces are discussed in the descriptions of FIGS. 3A-3F.

In FIG. 1, the administrator interface 106 provides a user input control 108, a permission input control 110, and a restriction input control 112. During state (a), the IT administrator enters data into the user input control 108 to identify a user or groups of users for whom the policy 107 will apply. The user(s) may be identified by user name (e.g., "Nate Godbout," "ngodbout," "nathan@example.com"), or user domain (e.g., "*.example.com," "hr.example.com"). In FIG. 1, the identified user group is all users within the "example.com" domain.

Next, the IT administrator enters a permission name into the permission input control 110 to specify the permission whose associated functionality, data, operations, or resources the identified application is permitted to access, or is restricted from accessing. In FIG. 1, the IT administrator has identified the "access email data" permission.

The permissions, and the code, data, or functionality associated with each permission, may be predefined by an application, operating system, or file system of the user device 104. In other examples, the IT administrator may manually configure permissions associated with the use of data repositories stored on or accessed by the user device 104, user device functions (e.g., microphone, location awareness, wireless connectivity), device capabilities (e.g., text messaging, data connectivity, cellular roaming), or other application or user device 104 features. The IT administrator may use the administrator interface 106 to manually configure such permissions.

Next, the IT administrator enters data into the restriction input control 112 to identify the type of restriction that is to be associated with the application identified in the application input control 108. In some implementations, the restriction options may include "restrict," "block," "permit," or "allow." A "restrict" or "block" selection may result in an application being placed on a blacklist for an identified permission, or in the application being removed or omitted from a whitelist for the identified permission. A "permit" or "allow" selection may result in the application being placed on a whitelist for an identified permission, or in the application being removed or omitted from a whitelist for the identified permission. In FIG. 1, the IT administrator has selected to "disable" applications that are associated with an "access email data" permission.

In other implementations, a restriction option is not specified by the IT administrator, and a default setting or a setting that is inherent to the type of permission is used. The IT administrator may instead specify, e.g., through a "seek approval" selection, that approval for an applications that "access email data" is to be sought when the user requests to download and install such an application. By this restriction, when the user seeks to download and install an application from the application marketplace 150 that requires access to email data, a request message may be sent across the network 130 from the application marketplace server 103 to the administrator server 102, and the IT administrator is presented with the option of allowing or disallowing the application from being downloaded and installed. The IT administrator selects an appropriate option, and an approval message or disapproval message is sent across the network 130 to the application marketplace server 103, and the user device 104 is allowed or disallowed to download and install the selected application based on the type or content of the message received by the application marketplace server 103.

During state (b), the administrator server 102 transmits the policy 107 identifying the specified user(s), restriction, and permission to the application marketplace server 103 through the network 130. The application marketplace server 103 stores the policy in a policy database. The policy database includes a data structure (e.g., a list) that identifies one or more policies, and a data structure that identifies one or more applications that may be available for download and installation on user devices. In general, the policy list identifies policies that are to be applied to applications, and the application list identifies applications and the permissions associated with each respective application.

During state (c), the user interacts with the application marketplace 150 to send a request to the application marketplace sever 103 to browse an inventory of applications. The request includes an identifier 114 of the user domain associated with the user and/or the user device 104.

During state (d), the application marketplace server 103 selects applications that are responsive to the user's request. The application marketplace server 103 also determines that some of the applications requested for browsing are governed by one or more particular permissions. For example, the application marketplace server 103 may determine that the user is requesting to browse "communication" applications (e.g., instant messenger clients, email clients, chat clients), and determines that among the inventory of "communication" applications available through the application marketplace server 103 are "communication" applications that have registered with the application marketplace server 103 that they utilize the "access email data" permission.

During state (e), the application marketplace server 103 sends information 116 that describes the selected applications back to the user device 104. The information 116 includes information that describes applications that are responsive to the user's request and are not restricted by policies, such as the policy 107, on the application marketplace server 103. In some implementations, the information 116 may omit descriptions of applications that have been restricted by policies on the application marketplace server 103. In some implementations, the information 116 may include descriptions of both allowed and restricted applications, as well as descriptions of the allowed and/or restricted statuses of the selected applications. For example, the information 116 may describe that an "application A" exists among the "communication" applications available through the application marketplace server 103, but that the "application A" is blocked from being downloaded and installed on the user device 104.

During state (f), the application marketplace 150 presents a display of the selected applications described by the information 116. In the illustrated example, the application marketplace 150 presents an application description 152 and an application description 154. The application descriptions 152, 154 describe (e.g., provide an application name, summary, screen shot, ratings information) the "application A" and an "application B". In the present example, "application A" and "application B" are both blocked from being downloaded and installed on the user device 104. For example, "application A" and "application B" may both be email client applications, and as such both may use the "access email data" permission as part of their functionalities.

Because the policy 107 restricts applications that have registered that they invoke functionality associated with the "access email data" permission, the application descriptions 152, 154 both include an indicator 156 that the described applications have been blocked from being downloaded and installed on the user device 104. The application descriptions 152, 154 both also include a user control 158 that the user can activate to obtain more information about why the respective application has been blocked. For example, the user may click on one of the user controls 158 and in response, the application marketplace 150 may present an explanation that the corresponding application has been blocked because users who belong to the "example.com" domain are restricted from using applications that utilize the "access email data" permission.

Figure 2:
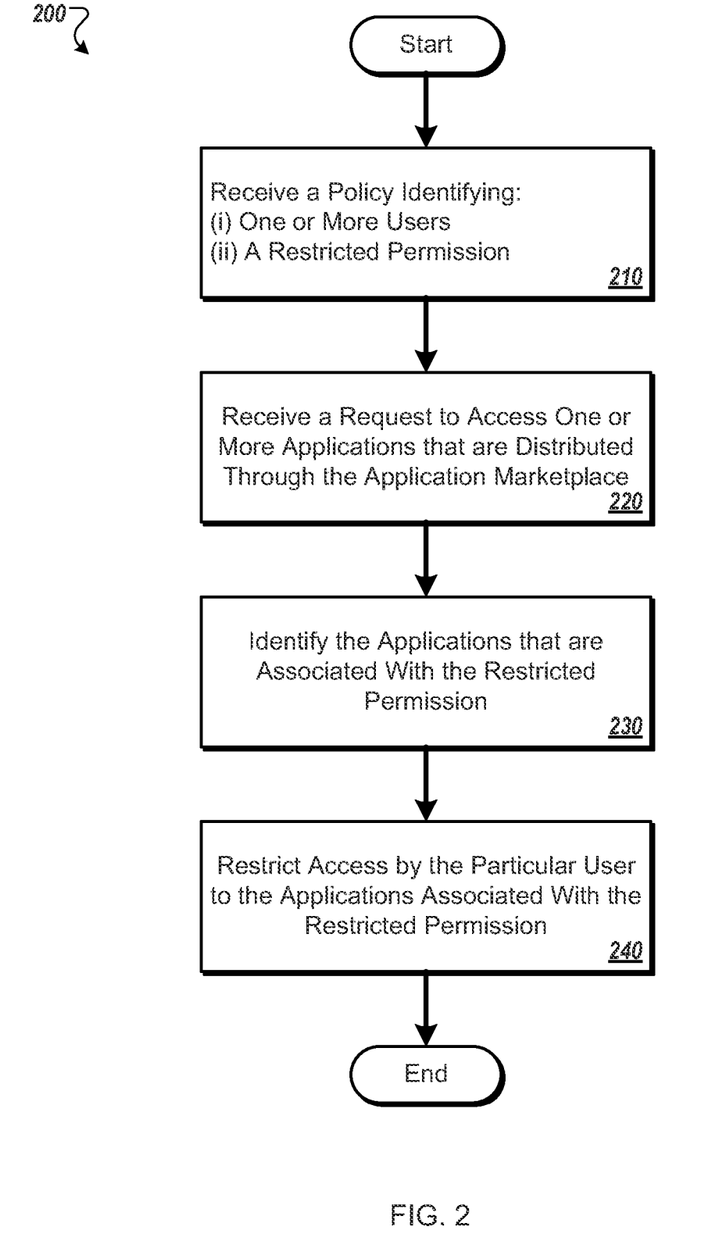
FIG. 2 is a flow chart that shows an example process for controlling access to applications.

FIG. 2 is a flow chart that shows an example process 200 for controlling access to applications. In some implementations, the process 200 can be performed by the application marketplace server 103 of FIG. 1.

At step 210, a policy that includes data that identifies (i) one or more users and (ii) a restricted permission is received from over a network and by one or more servers associated with an application marketplace. In some implementations, the policy may be received from a server associated with an information technology administrator. For example, during state (b), the application marketplace server 103 can receive the policy 107 from the administrator server 102, in which the policy 107 includes data that identifies a group of users (e.g., "*.example.com") and a restricted permission (e.g., "access email data=disable").

In some implementations, the policy may be received from a mobile device that is associated with the particular user. For example, the policy 107 may be provided to the application marketplace server 103 by the user device 104.

At step 220, a request to access one or more applications that are distributed through the application marketplace is received by the servers associated with the application marketplace, wherein the request includes data that identifies a particular one of the users. For example, during state (c), the user interacts with the application marketplace 150 to send the request to the application marketplace sever 103 to browse the inventory of applications. The request includes the identifier 114 of the user domain associated with the user and/or the user device 104.

In some implementations, identifying one or more of the applications that are associated with the restricted permission can include identifying one or more of the applications that perform one or more operations associated with the restricted permission. For example, the applications "A" and "B" described by the application descriptions 152 and 154 may perform operations that access email information, and are therefore restricted by the policy 107 that indicates that access to email data has been disabled for all users of the "example.com" domain.

In some implementations, identifying one or more of the applications that are associated with the restricted permission may include identifying one or more of the applications that declare use of the restricted permission. For example, the applications "A" and "B" described by the application descriptions 152 and 154 may declare their use of access to email data explicitly such as through a permission requirement manifest or through reflected metadata, or implicitly such as by being examined in an application "sandbox" provided by the application marketplace server, in which the application may be installed in a simulated deployment environment to detect the functions and resources that the application may attempt to access during execution.

At step 230, one or more of the applications that are associated with the restricted permission are identified by the servers associated with the application marketplace. For example, during state (d), the application marketplace server 103 selects the group of applications that are responsive to the user's request, and also determines that some of the applications requested for browsing are governed by one or more particular permissions.

At step 240, access by the particular user to the applications that are associated with the restricted permission is restricted by the servers associated with the application marketplace. For example, in states (e) and (f), the application marketplace server 103 provides the information 116 that includes information that describes applications that are responsive to the user's request. In some implementations, the user interface may identify the applications that are associated with the restricted permission, as restricted applications. For example, the application descriptions 152 and 154 include the indicators 156 that indicate that application "A" and application "B" have been "blocked".

In some implementations, the user interface may identify one or more applications that are not associated with the restricted permission, and may not identify the applications that are associated with the restricted permission. For example, the application marketplace 150 may show application descriptions for applications that are available for download and installation on the user device 104, and omit application descriptions for blocked applications.

In some implementations, a user interface can be provided that identifies the applications that are associated with the restricted permission, and that includes indicia that specifies that access to each of the applications that are associated with the restricted permission is restricted. For example, the application marketplace 150 is a user interface that displays the application descriptions 152 and 154, and includes the indicators 156 to indicate that the application descriptions 152 and 154 have been blocked for download and installation on the user device 104.

In some implementations, the indicator that indicate that access to each of the applications is restricted may be provided in a portion of the user interface that would otherwise be used to provide a user-selectable control for requesting distribution of one or more of the applications. For example, the indicators 156 may replace user controls that can be activated to download and install an unrestricted application (e.g., an "Install" button). In some implementations, the indicator that indicate that access to each of the applications is restricted may include a disabled control for requesting distribution of the applications. For example, the application description 152 may include an "install" button that is grayed out and/or has otherwise been made visibly distinct to indicate the unavailability of the associated application. In other examples, the entire application description 152 may be grayed out and/or otherwise made visible distinct indicate the unavailability of the associated application.

In some implementations, the user interface can include a user-selectable control for requesting moderation of the restricted permission. For example, the application description 152 may include a button that lets the user request access to application "A". The request may be sent to the administrator server 102, or may be relayed to the administrator server 102 by the application marketplace server 103. The administrator may receive the request, and respond by creating or modifying a policy that would allow the requested application "A" to be deployed and installed on the user device 104.

In some implementations, the servers associated with the application marketplace may provide indicia descriptive of each of the applications that are not associated with the restricted permission, and omitting indicia descriptive of each of the applications that are associated with the restricted permission. For example, the application marketplace server 103 may search for and return to the application marketplace 150 application descriptions for applications that the user is allowed to install, and omit results that describe applications that have been blocked for the user.

FIGS. 3A-3I show example screen shots 300a-300i of user interfaces for application marketplace that control access to applications. In some implementations, the screen shots 300a-300f may be views of the application marketplace 150 of FIG. 1.

Figure 3A:
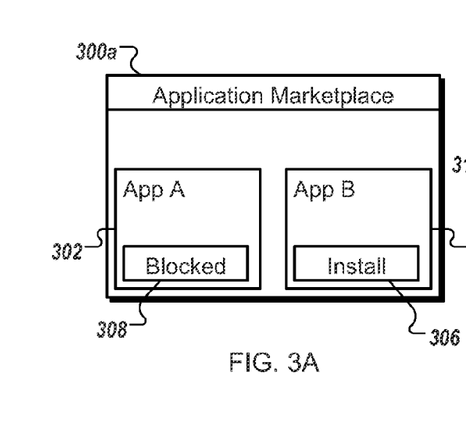
FIGS. 3A-3I show example screen shots of user interfaces for application marketplace that control access to applications.

FIG. 3A shows the example screen shot 300a. The screen shot 300a shows an application description 302 and an application description 304. The application description 304 includes a user control 306 that, when activated, will initiate the download and installation of the associated application "B" on a user device such as the user device 104.

In the illustrated example, the application "A" represented by the application description 302 has been restricted by an application marketplace server such as the application marketplace server 103. The application description 302 includes an indicator 308 that indicates that the application "A" has been blocked. In the illustrated example, the indicator 308 replaces a user control, such as the user control 306, that would otherwise allow the installation of the application associated with the application description 302.

Figure 3B:
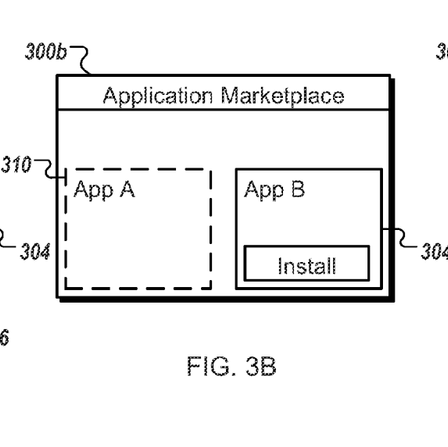

FIG. 3B shows the example screen shot 300b. The screen shot 300b shows the application description 304 and an application description 310. The application description 310 describes the application "A", which has been restricted by the application marketplace server. In the illustrated example, the application description 310 is grayed out to indicate the restricted status of the application "A". In some implementations, graying out of an application description such as the application description 310 may include altering the color saturation, transparency, opacity, brightness, contrast, z-order depth, color scheme, or combinations of these and/or other appropriate visual attributes of the application description.

Figure 3C:
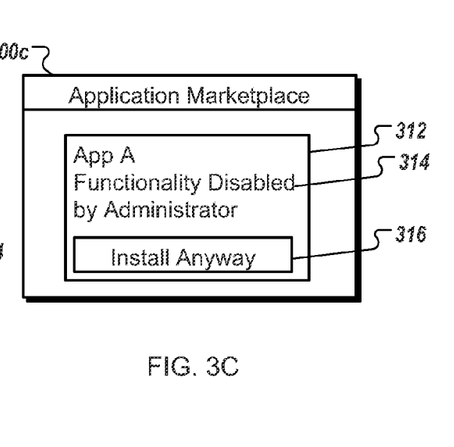

FIG. 3C shows the example screen shot 300c. The screen shot 300c shows an application description 312. The application description 312 includes a warning indicator 314 that warns that the functionality of application "A" has been restricted by an administrator. The application description 312 also includes a user control 316 that, when activated, initializes the download and installation of the associated application. In some implementations, the user control 316 can allow the user to install an application despite the fact that some or all functions of the application may be restricted.

For example, application "A" may be a navigation application that provides a way to email the user's location to others. As such, the user may still be able to install the application in order to use its navigation functions, but would be blocked from using the application's position emailing functions. Since the user would have previously seen the warning provided by the warning indicator 314, the user may experience less confusion or frustration over the blocked functionality than he or she may otherwise experience without being so forewarned.

Figure 3D:
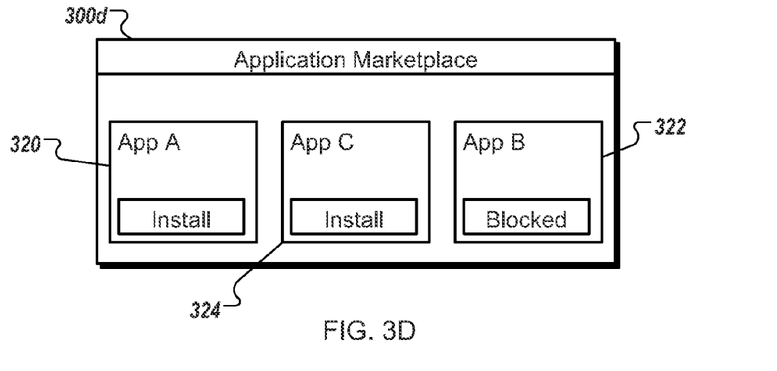

FIG. 3D shows the example screen shot 300d. The screen shot 300d shows an application description 320, an application description 322, and an application description 324. The application description 320 describes the allowed application "A", the application description 322 describes the blocked application "B", and the application description 324 describes an allowed application "C". In the illustrated example, the presentation of the application descriptions 320-324 is arranged in a modified alphabetical order. For example, without modification of the alphabetical presentation order, the application description 322 of the blocked application "B" would be displayed between the application descriptions 320 and 324. In the illustrated example, however, the alphabetical presentation order has been modified to rank and present the application descriptions 320 and 324 of the allowed applications "A" and "C" first, and to rank and present the application descriptions of blocked applications (e.g., the application description 322 of blocked application "B") lower than those of allowed applications.

Figure 3E:
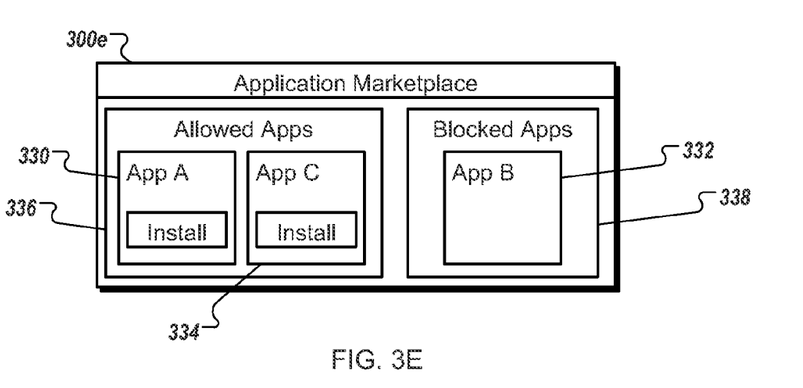

FIG. 3E shows the example screen shot 300e. The screen shot 300e shows an application description 330, an application description 332, and an application description 334. The application description 330 describes the allowed application "A", the application description 332 describes the blocked application "B", and the application description 334 describes the allowed application "C". In the illustrated example, the application descriptions 330 and 334 of the allowed applications "A" and "C" are included in a visibly distinct area 336. The application description 332 of the blocked application "B" is included in a visibly distinct area 338. The visibly distinct area 336 provides one or more visual cues that identify that the application descriptions 330 and 334 included within it describe applications that the user may download and install. The visibly distinct area 338 provides one or more visual cues that identify that the application description 332 included within it describes an application that is blocked for the user.

Figure 3F:
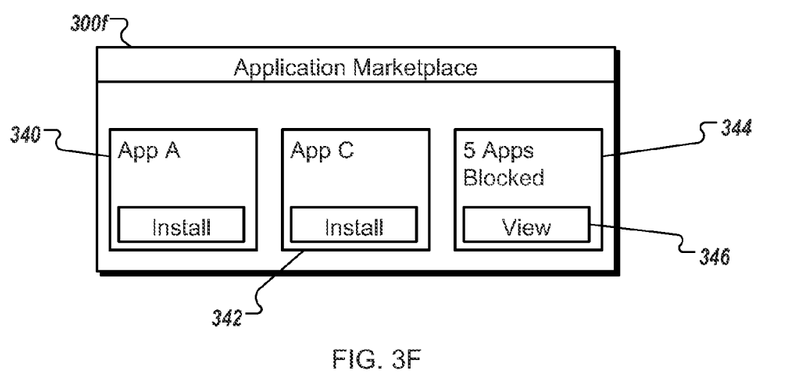

FIG. 3F shows the example screen shot 300f. The screen shot 300f shows an application description 340, and an application description 342. The application description 340 describes the allowed application "A", and the application description 342 describes the allowed application "C". In the illustrated example, five other applications and their corresponding application descriptions have been blocked. The blocked applications are indicated by a blocked application summary 344. In some implementations, the blocked application summary 344 can inform the user that one or more applications have been blocked from the user and present such information substantially without consuming as much screen space as would be required to display application descriptions for each blocked application separately.

The blocked application summary 344 includes a user control 346. The user control 346, when activated by the user, causes the blocked applications it describes to be presented. For example, the user may click the user control 346, and in response the screen shot 300f may be updated to resemble the screen shot 300d or the screen shot 300e.

Figure 3G:
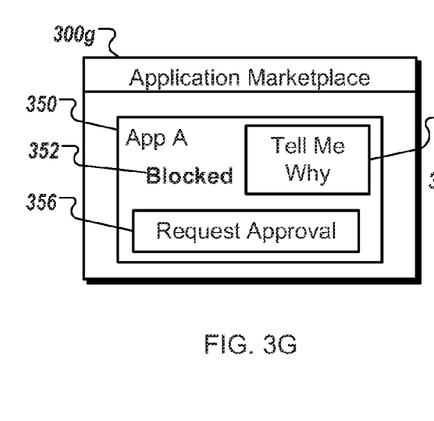

FIG. 3G shows the example screen shot 300g. The screen shot 300g shows an application description 350 for the application "A". The application description 350 includes an indicator 352 to indicate that application "A" has been blocked by the application marketplace server. A user control 354, when activated, causes additional information regarding the reason(s) why the associated application is restricted from the user. For example, the user may click the user control 354 to see a screen that displays information such as the privileges that have been restricted, the identity of the administrator or administrative authority that has restricted the privileges, the identity of scope of users who are affected by the restriction, and/or combinations of these and other appropriate information.

The application description 350 includes a user control 356. The user control 356, when activated by the user, causes a request for approval for the application "A" to be sent. For example, the application "A" may have been blocked in the past because the application "A" required access to a sensitive function, but that requirement has since been removed. By clicking the user control 356, the user may draw an administrator's attention to the application "A" to re-evaluate and possibly unblock the application "A" so the user can download and install it.

Figure 3H:
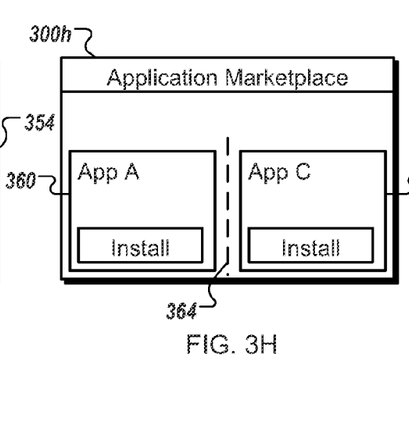

FIG. 3H shows the example screen shot 300h. The screen shot 300h shows an application description 360 for the application "A", and an application description 362 for an application "C". In the illustrated example a description for an application "B", which would otherwise be presented at a location 364 between the application description 360 and the application description 362, has been restricted by the application marketplace server. As such, the application description for the application "B" is omitted at the location 364.

Figure 3I:
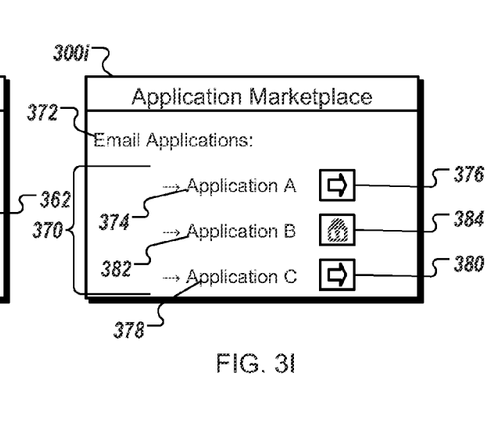

FIG. 3I shows the example screen shot 300i. The screen shot 300i presents a collection 370 of application descriptions for applications that are associated with a selected application category 372 (e.g., email applications). An application description 374 for the application "A" includes a user control 376. The user control 376, when selected by the user, initiates a request to be sent to the application marketplace server for the download and installation of application "A". Similarly, an application description 378 for the application "C" includes a user control 380. The user control 380, when selected by the user, initiates a request to be sent to the application marketplace server for the download and installation of application "C".

An application description 382 for the application "B" includes an indicator 384. In the illustrated example, unlike applications "A" and "C", the application marketplace server has restricted the application "B". The indicator 384 provides a visual notification that the application "B" described by the application description 382 has been blocked by the application marketplace server for download and installation by the user.

Figure 4:
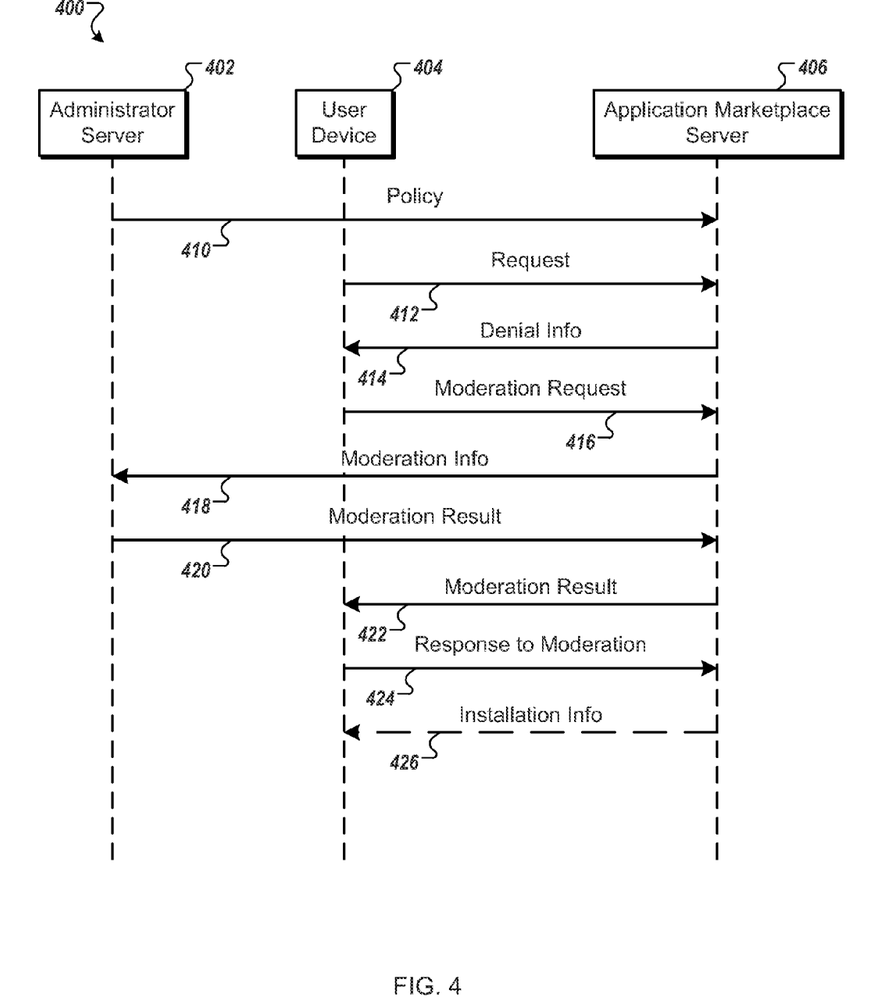
FIG. 4 is a timeline diagram that shows example interactions among systems for controlling access to application marketplace applications.

FIG. 4 is a timeline diagram 400 that shows example interactions among systems for controlling access to application marketplace applications. The interactions occur among an administrator server 402, a user device 404, and an application marketplace server 406. In some implementations, the administrator server 402 may be the administrator server 102 of FIG. 1, the user device 404 may be the user device 104, and the application marketplace server 406 may be the application marketplace server 103.

The interactions begin at 410 when the administrator server 402 sends policy information to the application marketplace server 406. In some implementations, the policy information can be the policy 107 of FIG. 1. The policy information describes users and privileges that an administrator has chosen to allow or disallow for the selected users. For example, the policy information may express that all users of the "area51.gov" domain are blocked from using the camera functions of the user device 404.

At 412, the user device 404 sends a request to the application marketplace server 406. In some implementations, the request may be a request for information about a collection of applications for display in an application marketplace such as the application marketplace 150. In some implementations, the request may be a request to download and/or install a selected application.

In the illustrated example, the application or applications requested by the user device 404 have been restricted by the policy sent at 410. The application marketplace server 406 therefore sends denial information to the user device 404 at 414.

At 416, the user device 404 sends a moderation request to the application marketplace server 406. At 416, the application marketplace server 406 forwards the moderation request to the administrator server 402. The moderation request is a request for an administrator of the administrator server 402 to review and possibly modify existing policies regarding privilege restrictions.

For example, the user of the user device 404 may believe that the requested application has been blocked by a policy that is overly broad, and send the request in an attempt to have the policy reviewed and updated to allow the installation of a selected application or category of applications. In another example, the user may send the request to obtain an individual or group exemption from one or more policies. For example, users belonging to the group "generals.area51.gov" may be allowed to install applications that access camera functions, while all other users of "area51.gov" remain blocked (e.g., "privates.area51.gov"). In yet another example, the user may request that an exemption be made for a particular application. For instance, the administrator may only allow "whitelisted" (e.g., tested, trusted, approved) email applications to access email data on corporate user devices (e.g., to prevent malicious or poorly written applications from accessing sensitive data), and as such when a new email application appears in the application marketplace, it too is blocked by the existing policy. The user may send the request in an attempt to have the administrator review and/or add the new application to the "white list" of allowed applications.

At 420, a moderation result is sent to the application marketplace server 406. In some implementations, the moderation result can include policy information that reflects the administrator's dispensation of the moderation request. For example, the administrator may update a policy to unblock selected permissions, may create a new policy to exempt selected users and/or applications from a restriction, may deny the request, and combinations of these and other appropriate responses to the moderation request. In some implementations, the administrator may simply ignore the moderation request. As such, the existing policies may remain unchanged and the application marketplace server 406 may treat the lack of response substantially the same as a denial of the moderation request.

At 422 the moderation result is sent to the user device 402. For example, the moderation result may indicate that the administrator has changed one or more policies in order to allow the download and installation of an application that was previous blocked for the user on the user device 404.

At 424, a response to the moderation is sent from the user device 404 to the application marketplace server 406. For example, the user may again attempt to download and install an application that was previously blocked, but is now allowed as a result of the moderation. At 426, installation information is sent from the application marketplace server 406 to the user device 404. For example, the installation information may be an application description, or it may be installable application program code.

Figure 5:
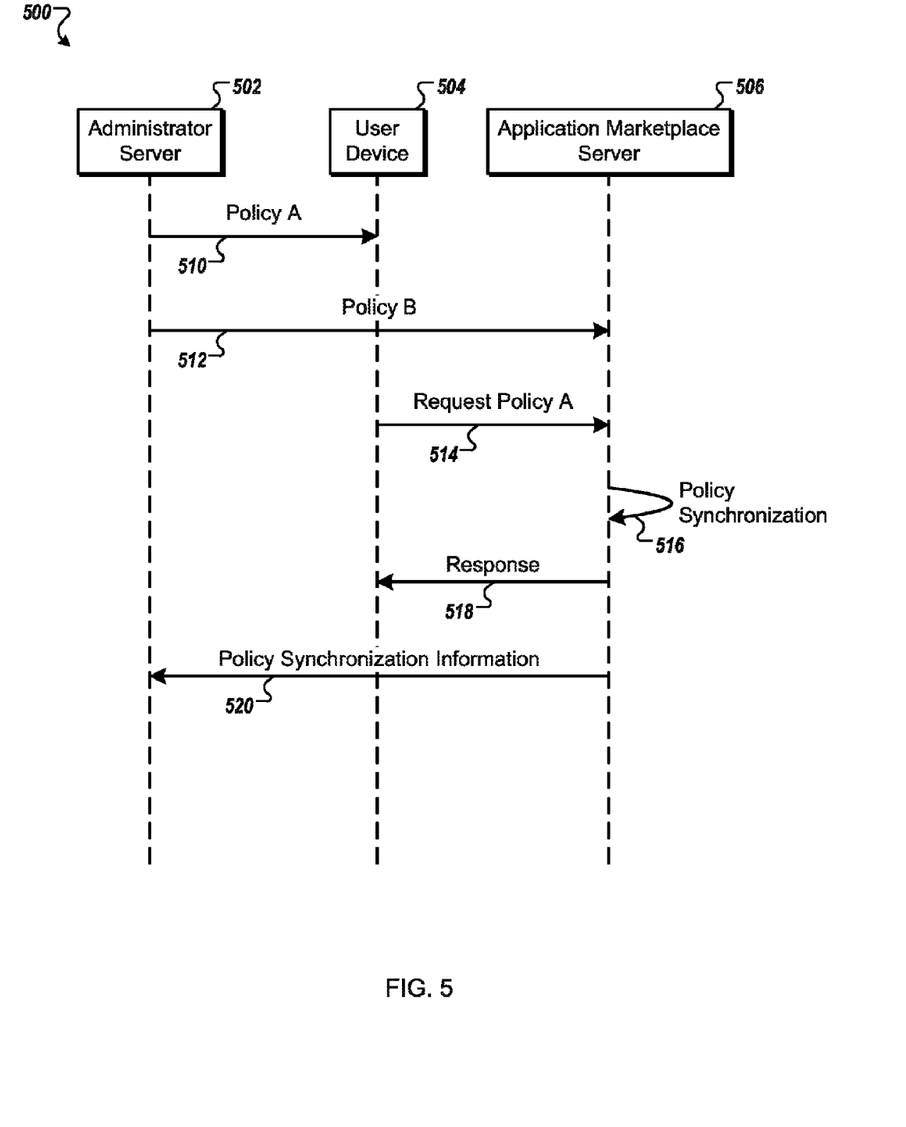
FIG. 5 is a timeline diagram that shows example interactions among systems for synchronizing policies for controlling access to application marketplace applications.

FIG. 5 is a timeline diagram 500 that shows example interactions among systems for synchronizing policies for controlling access to application marketplace applications. The interactions occur among an administrator server 502, a user device 504, and an application marketplace server 506. In some implementations, the administrator server 502 may be the administrator server 102 of FIG. 1 or the administrator server 402 of FIG. 4, the user device 504 may be the user device 104 or 404, and the application marketplace server 506 may be the application marketplace server 103 or 506.

At 510, the administrator server 502 sends a policy "A" to the user device 504. The policy "A" includes information that describes privileges that have been restricted for applications running on the user device 504. For example, an administrator may push or otherwise install a policy description file on the user device 504 to cause the user device 504 to allow or prevent applications from accessing selected functions of the user device 504.

At 512, the administrator server 502 sends a policy "B" to the application marketplace server 506. The policy "B" includes information that describes privileges that have been restricted for applications running on the user device 504. For example, the policy "B" may direct the application marketplace server 506 to selectively allow or block applications that utilize selected functions of selected users' user devices. In some implementations, policy "A" may be different from policy "B". For example, policy "A" may grant a selected permission while policy "B" restricts it.

At 514, the user device sends a policy request to the application marketplace server 506. The request includes the policy "A". The policy request is a request for the application marketplace server 506 to synchronize or otherwise update the policy information present on the user device 504. For example, the administrator may have blocked a selected function in policy "A", but later decided to allow the functionality in policy "B". By requesting the application marketplace server 506 to synchronize policy "A" and policy "B", the policies on the user device 504 may be updated to reflect current administrative restrictions, and may therefore allow the installation and operation of previously blocked applications on the user device 504.

At 516, the application marketplace server 506 performs a policy synchronization operation. In some implementations, the policy synchronization operation may favor the most recent policy restrictions. For example, if policy "B" is more recent than policy "A", then the settings provided by policy "B" may be implemented for settings that are also found in policy "A". In some implementations, the policy synchronization operation may favor the most restrictive policy restrictions. For example, if policy "A" restricts a privilege that policy "B" allows, then the settings provided by policy "A" may be implemented for settings that are also found in policy "B".

At 518, the application marketplace server 506 sends a response to the user device 504. The response includes information that describes the synchronized or otherwise updated policies that are to be applied to applications operating on the user device 504.

At 520, the application marketplace server 506 sends policy synchronization information to the administrator server 502. For example, the application marketplace server 506 may report conflicts that were determined to exist between policy "A" and policy "B". The administrator may use such information to update or otherwise modify permission policies for the user device 504 and/or the application marketplace server 506, or the administrator may be prompted to perform administrative actions directly upon the user device 504.

Figure 6:
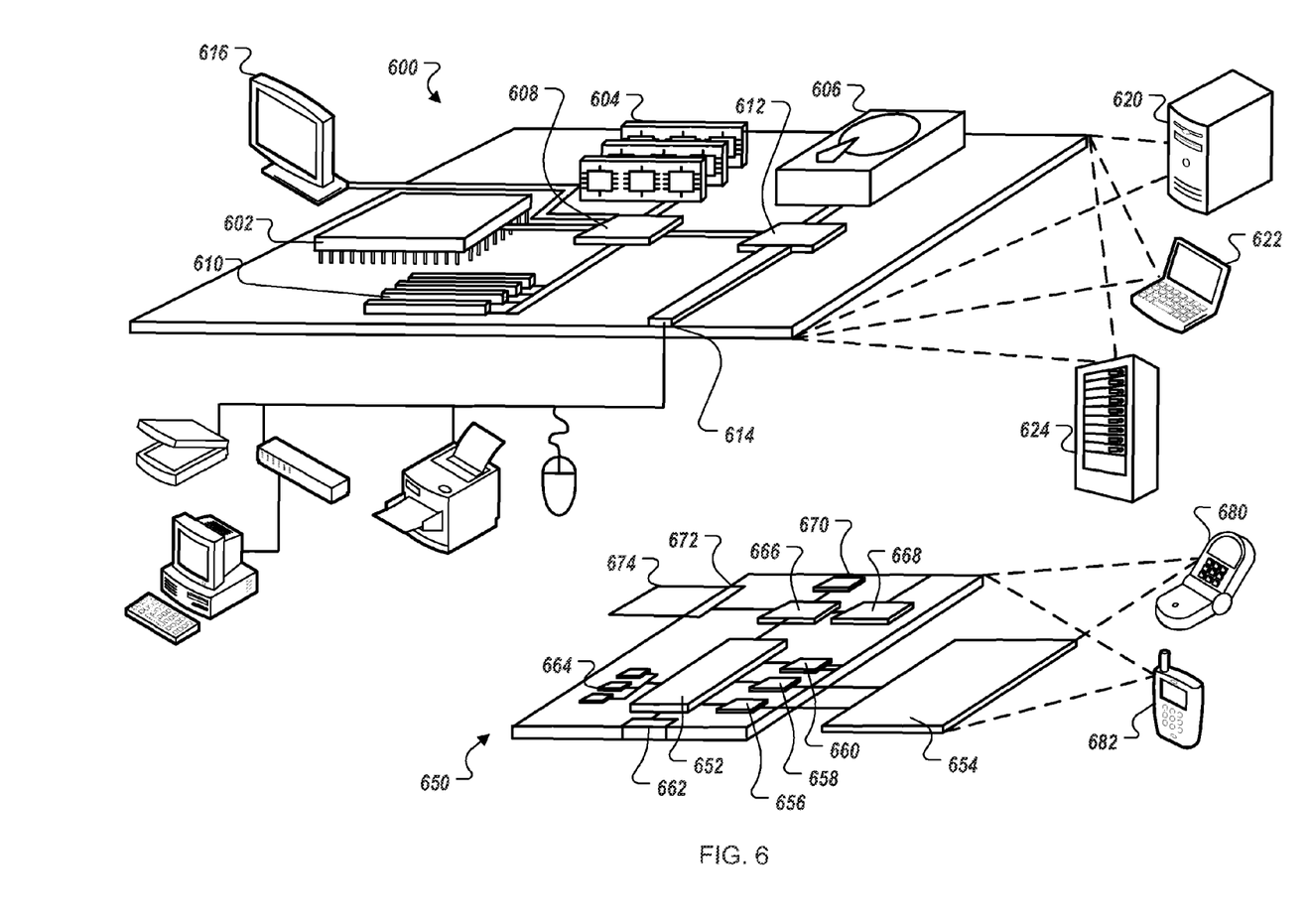
FIG. 6 is a block diagram of computing devices.

FIG. 6 is a block diagram of computing devices 600, 650 that may be used to implement the systems and methods described in this document, either as a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a non-transitory computer-readable medium. In one implementation, the memory 604 is a volatile memory unit or units. In another implementation, the memory 604 is a non-volatile memory unit or units.

The storage device 606 is a non-transitory computer-readable medium capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, various forms of the flows shown above may be used, with steps re-ordered, added, or removed. Also, although several applications of the systems and methods have been described, it should be recognized that numerous other applications are contemplated. Accordingly, other implementations are within the scope of the following claims.

What is claimed is:

1. A computer-implemented method comprising:
   receiving, by one or more servers associated with an application marketplace and from one or more servers associated with an organization, a policy that includes data that identifies one or more users that are associated with the organization, and a restricted operating system-defined permission;
   receiving, by the servers associated with the application marketplace and from a device associated with a particular user that is associated with the organization, a request to access one or more applications that are distributed through the application marketplace, wherein the request includes data that identifies the particular user;
   identifying, by the servers associated with the application marketplace, one or more of the applications that are associated with the restricted operating system-defined permission; and
   providing, by the servers associated with the application marketplace and to the device associated with the particular user that is associated with the organization, a user interface that identifies the one or more applications that are associated with the restricted operating system-defined permission, and that includes, for each of the identified applications, an indicator that indicates that access to each of the applications that are associated with the restricted operating system-defined permission is restricted.

2. The method of claim 1, wherein the policy is received from a server associated with an information technology administrator for the organization.

3. The method of claim 1, comprising:
   storing the policy in a collection of policies; and
   in response to receiving the request, selecting the policy from among the policies stored in the collection, using the data in the request that identifies the particular user.

4. The method of claim 1, wherein:
   the indicator further indicates that each of the applications are distributable through the application marketplace regardless of the restricted operating system-defined permission, and
   the user interface comprises a user-selectable control for requesting distribution of one or more of the applications regardless of the restricted operating system-defined permission.

5. The method of claim 1, wherein the indicator that indicates that access to each of the applications is restricted is provided in a portion of the user interface that would otherwise be used to provide a user-selectable control for requesting distribution of one or more of the applications.

6. The method of claim 1, wherein the indicator that indicates that access to each of the applications is restricted comprises a disabled control for requesting distribution of the applications.

7. The method of claim 1, wherein the user interface comprises a user-selectable control for requesting moderation of the restricted operating system-defined permission.

8. The method of claim 1, wherein the providing the user interface that identifies the applications that are associated with the restricted operating system-defined permission comprises greying out information that identifies the applications on the user interface.

9. The method of claim 1, wherein identifying one or more of the applications that are associated with the restricted operating system-defined permission comprises identifying one or more of the applications that perform one or more operations associated with the restricted operating system-defined permission.

10. The method of claim 1, wherein identifying one or more of the applications that are associated with the restricted operating system-defined permission comprises identifying one or more of the applications that declare use of the restricted operating system-defined permission.

11. A system comprising:
    one or more computers and one or more storage devices storing instructions that are operable, when executed by the one or more computers, to cause the one or more computers to perform operations comprising:
    receiving, by one or more servers associated with an application marketplace and from one or more servers associated with an organization, a policy that includes data that identifies one or more users that are associated with the organization, and a restricted operating system-defined permission;
    receiving, by the servers associated with the application marketplace and from a device associated with a particular user that is associated with the organization, a request to access one or more applications that are distributed through the application marketplace, wherein the request includes data that identifies the particular user;
    identifying, by the servers associated with the application marketplace, one or more of the applications that are associated with the restricted operating system-defined permission; and
    providing, by the servers associated with the application marketplace and to the device associated with the particular user that is associated with the organization, a user interface that identifies the one or more applications that are associated with the restricted operating system-defined permission, and that includes, for each of the identified applications, an indicator that indicates that access to each of the applications that are associated with the restricted operating system-defined permission is restricted.

12. The system of claim 11, wherein the policy is received from a server associated with an information technology administrator for the organization.

13. The system of claim 11, the operations further comprising:
  storing the policy in a collection of policies; and
  in response to receiving the request, selecting the policy from among the policies stored in the collection, using the data in the request that identifies the particular user.

14. The system of claim 11, wherein:
  the indicator further indicate that each of the applications are distributable through the application marketplace regardless of the restricted operating system-defined permission, and
  the user interface comprises a user-selectable control for requesting distribution of one or more of the applications regardless of the restricted operating system-defined permission.

15. The system of claim 11, wherein the indicator that indicates that access to each of the applications is restricted is provided in a portion of the user interface that would otherwise be used to provide a user-selectable control for requesting distribution of one or more of the applications.

16. The system of claim 11, wherein the indicator that indicates that access to each of the applications is restricted comprises a disabled control for requesting distribution of the applications.

17. The system of claim 11, wherein the user interface comprises a user-selectable control for requesting moderation of the restricted operating system-defined permission.

18. The system of claim 11, wherein the providing the user interface that identifies the applications that are associated with the restricted operating system-defined permission comprises greying out information that identifies the applications on the user interface.

19. The system of claim 11, wherein identifying one or more of the applications that are associated with the restricted operating system-defined permission comprises identifying one or more of the applications that perform one or more operations associated with the restricted operating system-defined permission.

20. The system of claim 11, wherein identifying one or more of the applications that are associated with the restricted operating system-defined permission comprises identifying one or more of the applications that declare use of the restricted operating system-defined permission.

21. A computer-readable device storing software comprising instructions executable by one or more computers which, upon such execution, cause the one or more computers to perform operations comprising:
  receiving, by one or more servers associated with an application marketplace and from one or more servers associated with an organization, a policy that includes data that identifies one or more users that are associated with the organization, and a restricted operating system-defined permission;
  receiving, by the servers associated with the application marketplace and from a client device associated with a particular user that is associated with the organization, a request to access one or more applications that are distributed through the application marketplace, wherein the request includes data that identifies the particular user;
  identifying, by the servers associated with the application marketplace, one or more of the applications that are associated with the restricted operating system-defined permission; and
  providing, by the servers associated with the application marketplace and to the client device associated with the particular user that is associated with the organization, a user interface that identifies the one or more applications that are associated with the restricted operating system-defined permission, and that includes, for each of the identified applications, an indicator that indicates that access to each of the applications that are associated with the restricted operating system-defined permission is restricted.

22. The computer-readable device of claim 21, wherein the policy is received from a server associated with an information technology administrator for the organization.

23. The computer-readable device of claim 21, the operations further comprising:
  storing the policy in a collection of policies; and
  in response to receiving the request, selecting the policy from among the policies stored in the collection, using the data in the request that identifies the particular user.

24. The computer-readable device of claim 21, wherein:
  the indicator further indicate that each of the applications are distributable through the application marketplace regardless of the restricted operating system-defined permission, and
  the user interface comprises a user-selectable control for requesting distribution of one or more of the applications regardless of the restricted operating system-defined permission.

25. The computer-readable device of claim 21, wherein the indicator that indicates that access to each of the applications is restricted is provided in a portion of the user interface that would otherwise be used to provide a user-selectable control for requesting distribution of one or more of the applications.

26. The computer-readable device of claim 21, wherein the indicator that indicates that access to each of the applications is restricted comprises a disabled control for requesting distribution of the applications.

27. The computer-readable device of claim 21, wherein the user interface comprises a user-selectable control for requesting moderation of the restricted operating system-defined permission.

28. The computer-readable device of claim 21, wherein the providing the user interface that identifies the applications that are associated with the restricted operating system-defined permission comprises greying out information that identifies the applications on the user interface.

29. The computer-readable device of claim 21, wherein identifying one or more of the applications that are associated with the restricted operating system-defined permission comprises identifying one or more of the applications that perform one or more operations associated with the restricted operating system-defined permission.

30. The computer-readable device of claim 21, wherein identifying one or more of the applications that are associated with the restricted operating system-defined permission comprises identifying one or more of the applications that declare use of the restricted operating system-defined permission.

* * * * *